United States Patent Office 2,900,663
Patented Aug. 25, 1959

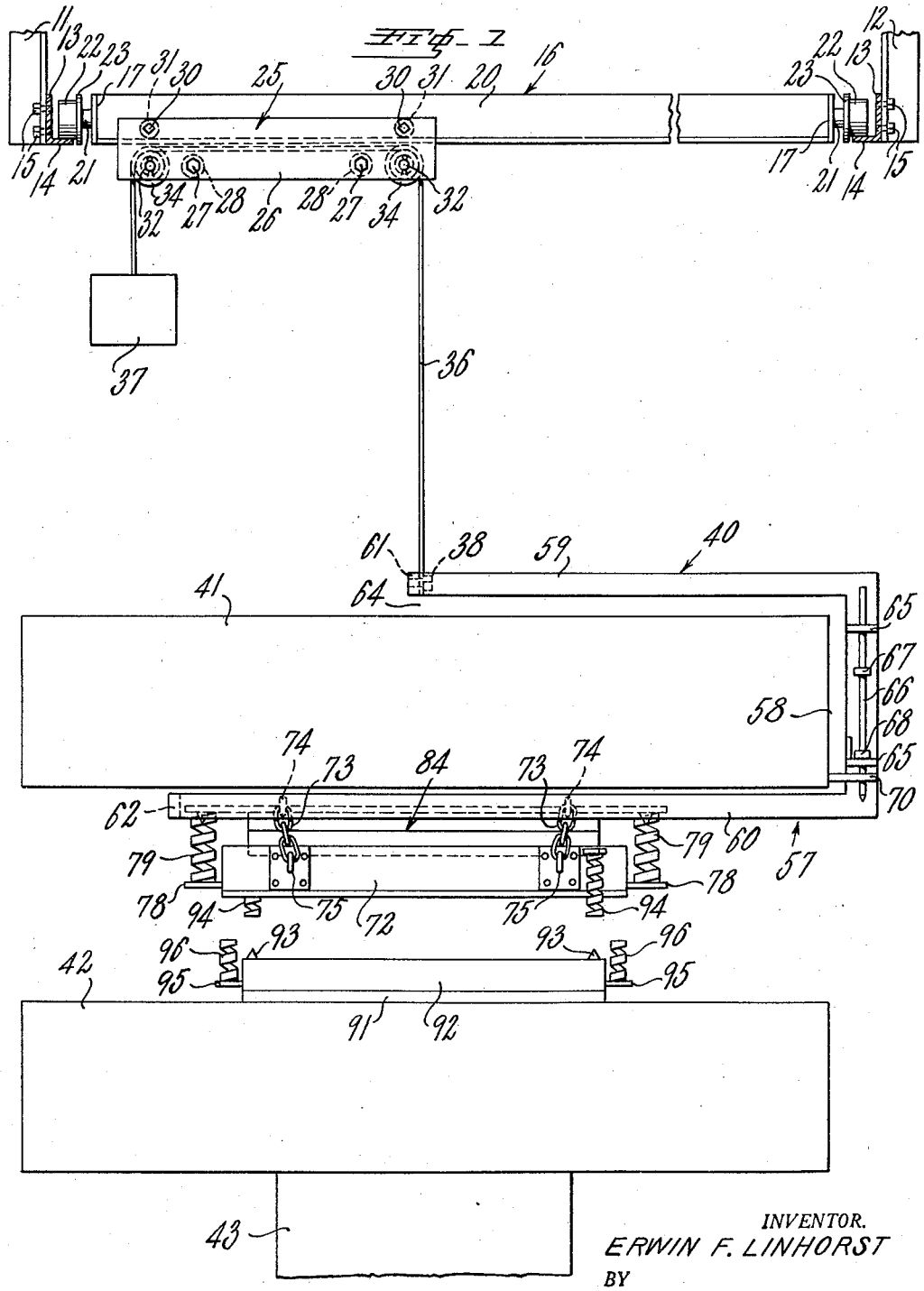

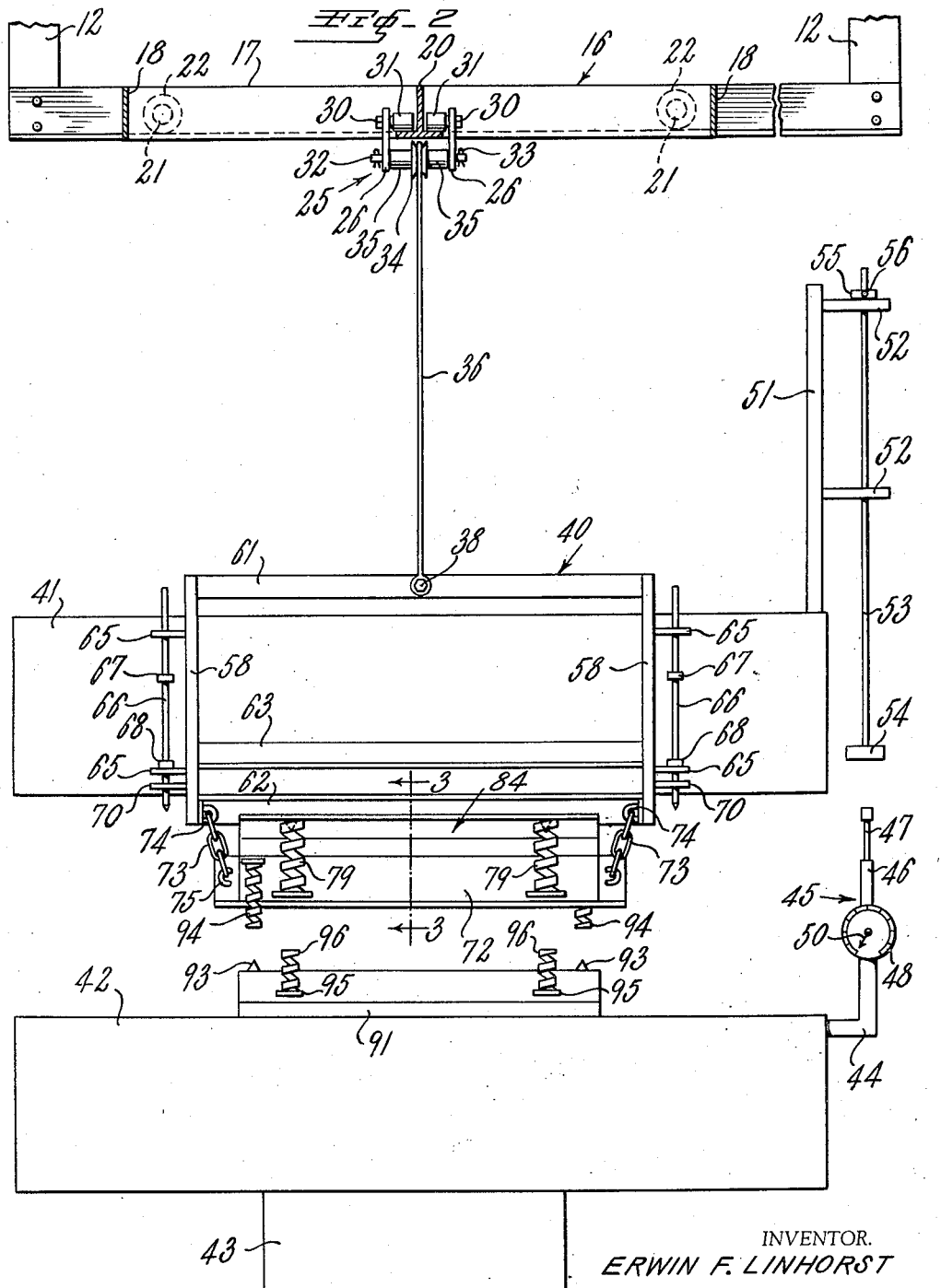

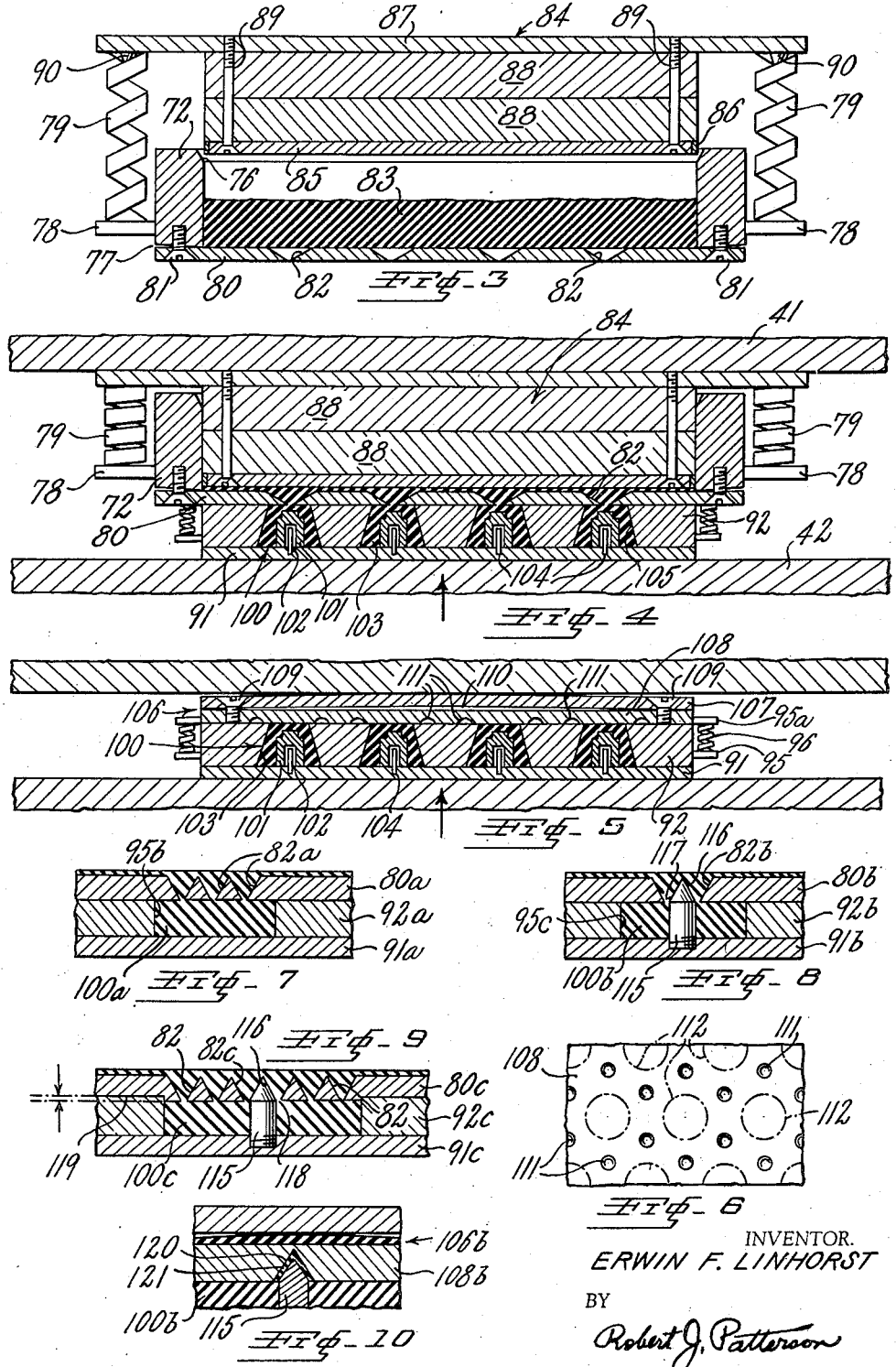

2,900,663

METHOD AND APPARATUS FOR MOLDING ARTICLES

Erwin F. Linhorst, Paterson, N.J., assignor to United States Rubber Company, New York, N.Y., a corporation of New Jersey Application October 18, 1956, Serial No. 616,834

5 Claims. (Cl. 18—5)

This invention relates to the molding of articles comprising a material, such as rubber and the like, and more particularly to an improved method and apparatus for molding such articles with virtually no waste of the material.

The primary object of this invention is to manufacture molded articles expeditiously and economically and without appreciable waste of molding material.

Another object of this invention is to minimize the formation of flash on molded articles.

Another object of this invention is to provide an improved and simplified method and apparatus for molding articles of various sizes and shapes and containing rubber or the like, without appreciable loss of material.

The invention has for a further object the provision of injection molding apparatus having improved features of design and construction.

A still further object of this invention is to provide apparatus of the character indicated that is sturdy and durable in construction, that is reasonable in manufacturing cost, that is economical in operating and maintenance costs and that is capable of performing its intended functions in an entirely satisfactory manner.

A preferred and recommended arrangement of apparatus constructed in accordance with this invention comprises a press and injection molding equipment. The press may be of any conventional type which includes a stationary upper platen and a vertically reciprocable lower platen.

The molding equipment includes a mold unit mounted on and reciprocable with the lower platen. This unit is formed with a plurality of cavities corresponding in configuration to the shape and size of the articles that are to be molded by the apparatus. The molding equipment also includes an injection unit which is suspended by a support, in the nature of a cradle, below the upper platen and in aligned relationship with the mold unit. The cradle is detachably connected to the upper platen and is adapted to be readily moved with the injection unit to another press, on completion of the injection step, by an overhead trolley and cable arrangement. The molding equipment additionally includes a cover unit that is substituted for the injection unit on completion of the injection step. The cover unit is maintained on the mold unit during the curing step.

The injection, mold and cover units have improved features of design and construction which contribute substantially to the utility and efficiency of this invention as will be appreciated from the detailed description appearing further along herein. It is believed sufficient to state here that the parts of the apparatus are so constructed and arranged as to effectively accomplish the objects of the invention.

The enumerated objects and other objects, together with the advantages obtainable by the practice of this invention, will be readily understood by persons skilled in the art upon reference to the following detailed description and the accompanying drawings, which respectively describe and illustrate one complete embodiment of the invention and several modifications thereof.

In the drawings:

Fig. 1 is a view in side elevation of an arrangement of apparatus constructed in accordance with this invention, certain parts being omitted for better illustration;

Fig. 2 is a view in front elevation of the apparatus shown in Fig. 1;

Fig. 3 is a view in enlargement taken along line 3—3 of Fig. 2 and shows the injection unit and its piston in one relative position prior to discharge of material from the injection unit;

Fig. 4 corresponds to Fig. 3 and additionally illustrates the mold unit and certain elements of the press, the parts being shown in their relative position at the time of completion of the injection step;

Fig. 5 is similar to Fig. 4 and illustrates a cover unit in place of the injection unit;

Fig. 6 is a bottom plan view of a portion of the cover unit;

Fig. 7 is a fragmentary vertical cross-sectional view of a modified sprue plate and mold unit;

Figs. 8 and 9 correspond to Fig. 7 and illustrate other modifications of the invention; and Fig. 10 is a fragmentary vertical cross-sectional view through a mold unit element and cover unit, and illustrates a further modification of the invention.

Referring now to the drawings, wherein like reference numerals denote corresponding parts throughout the several views and more particularly to Figs. 1 and 2, I have illustrated therein first and second pairs of vertically disposed angle members 11 and 12, respectively. Only one of angle members 11 is shown in the drawings. The angle members are all secured to and extend downwardly from an overhead structure, such as building beams (not shown). An angle unit, consisting of a vertical flange 13 and a horizontal flange 14, is attached to the lower ends of each pair of angle members by bolts 15.

Horizontal flanges 14 are parallel and serve as tracks for a trolley 16 which will now be described. The trolley comprises a rectangular frame consisting of parallel side plates 17 (Fig. 1) and parallel end plates 18 (Fig. 2). An inverted T-bar 20 is positioned within the confines of the frame and is secured at its ends to side plates 17. As shown in Fig. 2, the T-bar is positioned substantially equidistant from end plates 18. A pair of spaced parallel stub shafts 21 is secured to each side plate 17. Each stub shaft carries a wheel 22 having a flange 23. It will be evident from an examination of Figs. 1 and 2 that trolley 16 is movable to and fro along tracks 14.

Trolley 16 carries a second trolley 25 which comprises a pair of parallel plates 26 that are joined together and maintained in the illustrated spaced-apart relationship by bolts 27 and spacing sleeves 28. Each plate 26 is provided with a pair of spaced parallel shafts 30 that carry corresponding rollers 31 which ride on the lower flanges of T-bar 20 as shown in Fig. 2. Plates 26 support parallel shafts 32 which are maintained in place by cotter pins 33. A V-pulley 34 is mounted for rotation on each shaft 32. The pulleys are centered on their shafts by spacing sleeves 35. Trolley 25 has its parts so constructed and arranged as to permit of ready movement thereof along the T-bar. It will be noted that the path of travel of trolley 25 is normal to the path of travel of trolley 16.

A flexible steel cable 36 engages both pulleys, as best shown in Fig. 1. This cable is connected at one end to a counterweight 37 and at its other end, by a bolt or the like 38, to a support unit 40 that will be described in detail further along herein.

Figs. 1 and 2 generally illustrate several elements of a conventional molding press, namely an upper platen 41, a lower platen 42 and a vertically reciprocable ram 43. The upper platen is stationary while the lower platen is mounted on and reciprocable with the ram.

A bracket 66 (Fig. 2) is attached to one side of lower platen 42 and carries an indicator gauge unit 45 that includes a cylinder 46, a plunger 47 which is vertically slideable in the cylinder, a graduated dial 48 and a pointer 50 which is pivotal with respect to the dial. Plunger 47 is normally and yieldingly maintained in the illustrated raised position with respect to cylinder 46 by a spring (not shown). A post 51 is mounted on upper platen 41 and is equipped with a pair of vertically spaced arms 52. A rod 53 is vertically slideable through openings in the arms and carries a foot element 54 at its lower end. A collar 55 is affixed to the upper end of rod 53 by a set screw 56. This collar serves the dual functions of limiting downward movement of the rod and varying the effective length of the rod, as required. Rod 53 is aligned with plunger 47 and foot 54 is adapted to be engaged by the plunger on upward movement of lower platen 42. The gauge unit indicates the progress of the injection step which will be discussed further along.

Support unit 40 is in the nature of a cradle and comprises a pair of spaced parallel U-shaped members 57, each of which consists of a web 58, an upper arm 59 and a lower arm 60 (Fig. 1). A first crossbar 61 is welded to the free ends of arms 59 and carries bolt 38, earlier described. A second crossbar 62 is welded to the free ends of arms 60 while a third crossbar 63 is welded to webs 58. It will be observed that the illustrated arrangement of U-shaped members 57 and crossbars 61, 62 and 63 provides a rigid, sturdy, lightweight cradle defining an opening 64 for reception of upper platen 41.

Projecting outwardly from webs 58 are pairs of vertically spaced brackets 65. Each pair of brackets has aligned openings (not shown) through which a coupling pin 66 is slideable. The coupling pins are provided with stop collars 67 and 68 for limiting upward and downward movement of the pins relative to the upper platen. A pair of brackets 70, which are attached to the upper platen, have opening (not shown) for reception of the lower portions of pins 66. Each pin is pointed at its lower extremity to facilitate registry with the opening in corresponding bracket 70. When the parts are in the relative position shown in Figs. 1 and 2, pins 66 detachably connect cradle 40 to upper platen 41. Both pins may be readily moved upwardly until collars 67 engage their upper brackets 65 to disconnect the pins from brackets 70 and thus permit withdrawal of cradle 40 from the upper platen. The cradle and parts suspended therefrom may then be moved by means of cable 36 and trolleys 25 and 16 to another location, as required.

The injection molding equipment of this invention includes an injection unit comprising a circular cylinder 72 which is suspended below cradle 40 by four chains 73. Each chain is connected at one end to a cradle arm 60 by a first hasp 74 and at its other end to the injection cylinder by a second hasp 75. Cylinder 72 is formed with a first chamfer 76 at its upper end and a second chamfer 77 at its lower end. A plurality of brackets 78, preferably four, project laterally from the injection cylinder. An upstanding helical compression spring 79 is mounted on each of these brackets. A circular sprue plate 80 extends across and is attached to the lower end of cylinder 72 by stove bolts 81 and is provided with a plurality of downwardly convergent, frusto-conical sprues or discharge passages 82. The cylinder is adapted to contain a supply of molding material, such as a raw rubber composition, as indicated by numeral 83 in Fig. 3. It will be observed from an examination of Fig. 3 that, by virtue of chamfer 77, sprue plate 80 makes contact with the lower end of the injection cylinder over a relatively narrow band. This has the effect of concentrating the force exerted by bolts 81 over a small area, thereby ensuring an adequate seal between the sprue plate and cylinder and preventing leakage of material 83.

A piston 84, best shown in Fig. 3, is slideable in cylinder 72 and is adapted to force material 83 downwardly through sprues 82. This piston is made up by a plurality of plates, namely a bottom plate 85 having a peripheral facing ring 86, a top plate 87 and a pair of plates 88 intermediate the top and bottom plates, all of which are joined together by bolts 89. Plates 85 and 87 are made of steel or other suitable metal. Facing ring 86 is made of bronze, brass or other metal that will not scratch or otherwise mar the inner surface of cylinder 72. Plates 88 are made of a suitable insulating material such as "Transite." The diameter of plates 85 and 88 is slightly less than the inside diameter of the cylinder to permit of relative sliding movement between the piston and the cylinder. It will be noted that cylinder chamfer 76 facilitates entry of the lower end of the piston into the upper end of the cylinder. Piston top plate 87 extends laterally beyond the cylinder and is provided with a plurality of depending conical bosses 90. These bosses project into the upper ends of compression springs 79 and maintain these springs in alignment. Springs 79 normally and yieldingly urge the piston to raised position relative to the cylinder (Fig. 3).

Mounted on lower platen 42 is a mold unit which consists of a bottom mold plate 91 and a cavity mold plate 92, the latter plate being provided with a pair of upstanding conical bosses 93 (Fig. 1) that serve the same function as bosses 90. Bosses 93 are adapted to enter the lower ends of corresponding helical compression springs 94, which are secured to and extend downwardly below cylinder 72, and thereby effect proper alignment of sprue plate 80 with cavity mold plate 92. The cavity mold plate is also provided with a plurality of lateral brackets 95 (Figs. 1 and 2) that support upstanding helical compression springs 96. Springs 94 and 96 are so constructed and arranged to be compressed during the injection step and expanded on completion of the injection step to effect separation of the mold unit from the injection unit.

The particular mold construction illustrated in Figs. 1–5 is adapted to form a plurality of rubber articles, such as frusto-conical bumpers 100 which are shown in Figs. 4–5. Each bumper consists of a metal insert or core 101, having a blind bottom tap 102, and a rubber covering or sheath 103. Pins 104 which are attached to bottom plate 91 register with the insert taps and thus properly position the inserts prior to and during molding of the rubber sheath thereon.

Cavity mold plate 92 is formed with a plurality of through openings or cavities 105. There is a cavity 105 for each pin 104 and for each sprue 82. Also, the configuration of each cavity is the same as the shape of bumpers 100. When the parts are in the relative position shown in Fig. 4, each sprue 82 is in direct communication with a corresponding cavity 105.

The injection unit is adapted to be replaced by a mold cover unit 106 (Figs. 5 and 6) during the practice of this inventon. The cover unit includes an upper plate 107 and a lower plate 108 that are joined together by bolts 109. A thin, lens-shaped, cured rubber pad 110 is interposed between plates 107 and 108. Plate 108 is provided with a plurality of lateral brackets 95a, which are aligned with brackets 95 and engaged by springs 96 when the cover unit and the mold unit are in the relative position shown in Fig. 5. The lower surface of plate 108 is planar with the exception of a plurality of shallow depressions or flash pits 111. These pits serve as a means of escape for the flash between the lower surface of plate 108 and the upper surface of cavity mold plate 92 during the curing operation. The circular areas 112, defined by the dot-dash lines in Fig. 6 indicate the portions of the lower surface of plate 108 which are directly over the upper ends of cavities 105. These areas are devoid of flash pits.

Ram 43 possesses sufficient rigidity to preserve the plane of lower platen 42 when the parts are under pressure. Upper platen 42, in many presses, has less rigid support above it. As a consequence, the pressure of the rubber in the mold cavities and the flash may cause slight deformation of cover unit 106 and of upper platen 42 into a "watch glass" shape. It will be appreciated that this will cause the flash in the center of the mold to be thicker than at the edges. I compensate for deformation of upper platen 41 by providing rubber pad 110 between plates 108 and 109. This is accomplished by clamping a thin sheet of raw rubber between these plates and curing the same in the press. Cover unit 106 will then conform to the deformation of upper platen 41 during subsequent curing of rubber articles in the mold equipment but plate 108 will remain substantially flat.

In the practice of this invention, employing the above-described apparatus, it is first assumed that the parts are assembled and in the relative position shown in Figs. 1, 2 and 3. With the parts so arranged, the injection unit is directly above but out of engagement with the mold unit and piston 84 is at its uppermost position relative to cylinder 72. As ram 43 moves upwardly, the mold unit is brought into operative engagement with the injection unit, against the action of springs 94 and 96, and sprues 82 are placed in direct communication with cavities 105. Continued upward movement of the ram results in upward movement of cylinder 72 relative to piston 84, against the action of spring 79, and causes a sufficient amount of material 83 in the cylinder to be injected into and fill cavities 105. At the time of such injection the parts are in the relaive position shown in Fig. 4.

When the press closes during the injection step springs 94 engage cones 93 to align the sprue plate with the cavity mold plate. After injection is completed and the press is reopened, due to downward movement of ram 43, springs 94 urge the sprue plate and cavity mold plate apart thereby severing the rubber sprue connections. During the injection step, dial unit 45 and associated devices indicate the progress of injection.

When the parts return the relative position shown in Figs. 1 and 2, after injection, cradle 40 is disconnected from upper platen 41 by raising pins 66 after which the cradle and the injection unit are transferred in unison by trolleys 16 and 25 to another press.

On removal of the cradle and the injection unit from the press, cover unit 106 is placed on cavity mold plate 92. Ram 43 is again moved upwardly to place the cavity mold unit and the cover unit in compression (Fig. 5). Articles 100 are then subjected to any conventional procedure to cure the rubber sheaths 103 of the articles. Flash pits 111 permit escape for the flash from between the contacting surfaces of cavity mold plate 92 and cover plate 108. This substantially reduces the thickness of the flash that is formed around the articles. All such flash may be readily removed by tumbling the articles, after curing, with solid carbon dioxide.

On reopening the press, after the articles are cured, cover unit 106 is moved upwardly and separated from mold plate 92 due to the action of springs 96. This eliminates the time and labor otherwise required to pry the cover unit from the mold unit.

The injection unit of Figs. 3 and 4 contemplates the provision of a single, constricted sprue 82 for each mold plate cavity 105. This arrangement is entirely satisfactory for molding small articles, such as bumpers 100. Figs. 7, 8 and 9 illustrate modified sprue plate and cavity mold plate constructions for expeditiously molding various types of relatively large articles. The elements appearing in Figs. 7, 8 and 9 that correspond to earlier described elements are identified by like numerals but with suffix letters.

Referring to Fig. 7, the modification illustrated therein includes a sprue plate 80a having a group of sprues 82a. Mold plate 92a is formed with a cavity 95b for each group of sprues. The configuration of cavity 95b corresponds to the shape of article 100a. Each sprue 82a is preferably the same as sprues 82 and defines a constricted circular discharge opening. By providing a group of sprues for each cavity, the raw material is admitted into the cavity more quickly than if only a single such sprue is used.

The modification illustrated in Fig. 8 is adapted to form hollow or ring shaped articles 100b. Sprue plate 80b is provided with a large sprue 82b. Mold plate 92b defines, by itself, a circular cavity 95c. Bottom plate 91b carries an upstanding pin 115 that has a conical upper end 116. The parts are so arranged that pin end 116 extends into sprue 82b and forms an annular passage 117 with the sprue.

The modification of the invention shown in Fig. 9 combines the features appearing in Figs. 7 and 8 and includes an additional feature. Sprue plate 80c of Fig. 9 includes groups of sprues each consisting of a plurality of sprues 82 and an enlarged central sprue 82c which defines an annular passage 118 with the conical upper end 116 of pin 115. This arrangement permits the ready molding of relatively large hollow articles 100c. Sprue plate 80c has a bottom annular recess 119 for reception of the upper end of mold plate 92c. This minimizes the formation of flash on the article 100c.

Referring next to Fig. 10, I have illustrated therein a modified form of cover unit 106b that is adapted to be used in lieu of cover unit 106 with the mold plates of Figs. 8 and 9. Bottom cover plate 108b is provided with conical openings 120 that are lined with hollow cured rubber inserts 121 for reception of the pointed ends of corresponding pins 115 during the curing step.

From the foregoing, it is believed that the method and apparatus for practicing my instant invention will be readily comprehended by persons skilled in the art. It is to be clearly understood, however, that various changes in the apparatus herewith shown and described and in the method of practicing the invention, outlined above, may be restorted to without departing from the spirit of the invention as defined by the appended claims.

Having thus described my invention, what I claim and desire to protect by Letters Patent is:

1. In a cover unit for use with a mold unit during curing, within the mold unit, of a molded article comprising a material, such as a rubber, a pair of substantially planar and rigid plates disposed one above the other and a pad comprising cured rubber positioned between and bearing against both plates, the surface of the pad that bears against one plate being convex.

2. In a cover unit for use with a mold unit during curing, within the mold unit, of a molded article comprising a material, such as rubber, a lower plate adaped to be placed in engagement with a mold unit, an upper plate above the lower plate, said plates being substantially rigid and planar, and a pad comprising cured rubber positioned between and bearing against both plates, the surface of the pad that bears against the upper plate being convex and the surface of the pad that bears against the lower plate being substantially planar.

3. In a cover unit for use with am old unit during curing, within the mold unit, of a molded article comprising a material, such as rubber, a lower plate adaped to be placed in engagement with a mold unit, an upper plate above the lower plate, said plates being substantially rigid and planar, a pad comprising cured rubber positioned between and bearing against both plates, the surface of the pad that bears against the upper plate being convex, and a cured rubber member carried by the lower plate and defining an opening that merges with the bottom surface of the lower plate, said opening being adapted to receive an element of the mold unit.

4. A method of molding rubber-like articles in a platen press comprising, disposing a loaded stock injecting unit and an open empty mold between the platens of the press, closing the platens to press said injecting unit and mold together and to actuate said injecting unit to inject stock into said mold, immediately after injecting said stock and before said stock can cure opening said platens and removing said injecting unit, replacing said injecting unit with a cover to close said mold, then closing said platens to press said cover and mold together, and curing the stock in said mold while said cover and mold are held together by the pressure of said platens.

5. The method of claim 4 in which a pad of rubber is interposed between the cover and one platen to compensate for any deformation of said one platen and thereby prevent deformation of the cover when said platens are pressed together.

References Cited in the file of this patent

UNITED STATES PATENTS

| | | |
|---|---|---|
| 1,952,628 | MacDonald | Mar. 27, 1934 |
| 2,592,296 | Kutik | Apr. 8, 1952 |
| 2,672,652 | Howe et al. | Mar. 23, 1954 |

FOREIGN PATENTS

| | | |
|---|---|---|
| 645,093 | France | June 25, 1928 |
| 624,903 | Great Britain | June 17, 1949 |